(12) United States Patent
Hoffman

(10) Patent No.: US 11,754,142 B2
(45) Date of Patent: Sep. 12, 2023

(54) LOW DISPLACEMENT, FAIL SAFE, ALL ATTITUDE, UNIVERSAL ISOLATOR

(71) Applicant: BAE SYSTEMS Information and Electronic Systems Integration Inc., Nashua, NH (US)

(72) Inventor: Jonathan E. Hoffman, Nashua, NH (US)

(73) Assignee: BAE Systems Information and Electronic Systems Integration Inc., Nashua, NH (US)

( * ) Notice: Subject to any disclaimer, the term of this patent is extended or adjusted under 35 U.S.C. 154(b) by 104 days.

(21) Appl. No.: 17/330,748

(22) Filed: May 26, 2021

(65) Prior Publication Data
US 2022/0381320 A1    Dec. 1, 2022

(51) Int. Cl.
*F16F 15/08*    (2006.01)
*F16M 13/02*    (2006.01)

(52) U.S. Cl.
CPC ............. *F16F 15/08* (2013.01); *F16M 13/02* (2013.01)

(58) Field of Classification Search
CPC .. F16F 15/08; F16F 3/08; F16F 3/0873; F16F 1/3735; F16F 1/44; F16F 13/24; F16M 13/02
USPC ......................................................... 267/160
See application file for complete search history.

(56) References Cited

U.S. PATENT DOCUMENTS

| | | | | |
|---|---|---|---|---|
| 2,019,052 A * | 10/1935 | Lord | ...................... | A47B 31/00 267/292 |
| 2,393,071 A * | 1/1946 | Schaelchlin | .......... | F16F 3/0873 248/635 |
| 2,502,322 A * | 3/1950 | Iredell, Jr. | ............... | F16F 13/08 267/140.11 |
| 2,562,195 A * | 7/1951 | Lee | .......... | F16F 13/24 267/140.13 |
| 2,582,998 A * | 1/1952 | Lee | .......... | F16F 13/24 267/140.13 |
| 4,214,738 A * | 7/1980 | Casper | .................. | F16F 3/0876 267/141.1 |
| 4,326,693 A * | 4/1982 | Noble | ..................... | H01H 50/30 335/229 |
| 4,884,656 A * | 12/1989 | Baheti | ..................... | B41J 29/04 181/207 |
| 5,028,163 A * | 7/1991 | Krieg | ....................... | B62D 7/16 403/132 |
| 5,044,338 A * | 9/1991 | Shelton | ............... | F02M 69/465 123/456 |

(Continued)

*Primary Examiner* — Robert A. Siconolfi
*Assistant Examiner* — James K Hsiao
(74) *Attorney, Agent, or Firm* — Maine Cernota & Rardin; Gary McFaline

(57) ABSTRACT

An isolator, the isolator comprising an isolator comprising a lower isolator post and an upper isolator post; an isolator compression disk configured to be secured to the upper isolator post; and at least three gaskets configured to be retained, in use, between an upper face of the isolator and a lower face of the isolator compression disk, wherein the lower isolator post, in use, is configured to be affixed to a first apparatus, wherein the upper isolator post is configured to be inserted through an aperture of a second apparatus, wherein the isolator compression disk is configured to retain the second apparatus against the isolator, and wherein the at least three gaskets are configured to prevent any direct contact between the isolator and the second apparatus.

10 Claims, 6 Drawing Sheets

(56) References Cited

U.S. PATENT DOCUMENTS

| | | | | |
|---|---|---|---|---|
| 5,110,081 A * | 5/1992 | Lang, Jr. | F16F 3/0873 | 267/293 |
| 5,195,728 A * | 3/1993 | Skipper | F16F 13/16 | 267/140.13 |
| 5,306,121 A * | 4/1994 | Heflin | F16F 15/08 | 417/363 |
| 5,366,200 A * | 11/1994 | Scura | F16F 7/00 | |
| 5,762,324 A * | 6/1998 | Wilbourn | F16F 1/3732 | 267/293 |
| 5,842,677 A * | 12/1998 | Sweeney | F16F 1/3863 | 267/293 |
| 5,879,098 A * | 3/1999 | Delepine | F16J 15/52 | 277/634 |
| 6,017,073 A * | 1/2000 | Lindblom | F16F 1/38 | 296/190.07 |
| 6,095,481 A * | 8/2000 | Norkus | B60G 99/004 | 248/560 |
| 6,308,927 B1 * | 10/2001 | Leahy | E01F 9/635 | 248/548 |
| 6,416,030 B1 * | 7/2002 | Bergdahl | B62D 27/04 | 267/141 |
| 6,471,179 B1 * | 10/2002 | Tousi | F16F 1/3732 | 296/35.1 |
| 6,557,815 B1 * | 5/2003 | Klein, II | B05B 7/2405 | 248/609 |
| 6,820,908 B1 * | 11/2004 | Tousi | B62D 21/11 | 248/609 |
| 6,910,671 B1 * | 6/2005 | Norkus | B62D 24/02 | 248/560 |
| 7,073,624 B2 * | 7/2006 | Decanio | H04R 1/2873 | 181/150 |
| 7,163,200 B2 * | 1/2007 | Dickson | F16F 1/3735 | 267/293 |
| 7,261,274 B2 * | 8/2007 | Vatsaas | F16F 15/08 | 248/573 |
| 7,785,054 B2 * | 8/2010 | Parisi | B60R 13/0206 | 411/338 |
| 7,900,873 B2 * | 3/2011 | Kulesha | B64C 27/001 | 244/135 R |
| 7,922,156 B2 * | 4/2011 | Goudie | F16F 13/103 | 267/293 |
| 8,939,437 B2 * | 1/2015 | Kobori | F16F 1/3735 | 267/140.3 |
| 9,091,322 B2 * | 7/2015 | Wang | F16M 5/00 | |
| 9,765,845 B2 * | 9/2017 | Bradshaw | F16F 13/10 | |
| 9,771,030 B1 * | 9/2017 | DeHaai | F16F 1/3735 | |
| 9,878,772 B2 * | 1/2018 | Lucas | B64C 1/403 | |
| 10,059,427 B2 * | 8/2018 | Lucas | B64F 5/10 | |
| 10,088,009 B2 * | 10/2018 | Nydam | B62D 24/02 | |
| 10,150,444 B1 * | 12/2018 | Schwalm | E05F 5/02 | |
| 10,655,697 B2 * | 5/2020 | Senneff | F16F 1/3863 | |
| 2013/0038006 A1 * | 2/2013 | Saito | F16F 13/1463 | 267/140.13 |
| 2013/0069288 A1 * | 3/2013 | Saito | F16F 13/1481 | 267/140.13 |
| 2013/0207328 A1 * | 8/2013 | Awtar | F16F 1/00 | 267/160 |
| 2017/0166025 A1 * | 6/2017 | Auten | B60G 11/12 | |

* cited by examiner

LOW DISPLACEMENT, FAIL SAFE, ALL ATTITUDE, UNIVERSAL ISOLATOR

STATEMENT OF GOVERNMENT INTEREST

This disclosure was made with government support under contract number 17C1018. The United States Government has certain rights in the disclosure.

FIELD OF THE DISCLOSURE

The following disclosure relates generally to the isolation of noise, vibration, and harshness (NVH) and, more specifically, to low displacement, fail safe, all attitude, universal isolators.

BACKGROUND

Resonance is the tendency of a system to respond at greater amplitude when the frequency of its oscillations matches the system's natural frequency of vibration, its resonant frequency, than it does at other frequencies. This phenomenon, if not properly mitigated or taken into account during the design phase, often results in a failure of the system due to the high and rapidly oscillating forces encountered at the resonant frequency.

Furthermore, in systems subject to relatively high forces and levels of vibration, such as airplanes, spacecraft, engines, and others, the resonant frequencies of even relatively small subassemblies must be taken into account to ensure that they do not fail in operation. For instance, RF switches have been found to be particularly susceptible to resonance due to vibrational forces in a structure to which they are mounted. Current mechanical isolators, which are commonly used to mitigate such issues, however, have issues that prevent or limit their usage.

Referring to FIG. 1, a prior art mechanical isolator is depicted, showing metal studs 102 bonded to a viscoelastic material 100, which attenuates vibrational forces and tends to mitigate resonance. In such prior art mechanical isolators, the mechanical path is through the viscoelastic material 100. This means that the ability of the structure to survive relies on this material staying bonded to the metal stud 102 without breaking. Unfortunately, this renders the design useless where the forces on the mechanical isolator are expected to exceed those of the viscoelastic material 100 or its bond to the studs 102.

Even where the viscoelastic material 100 and its bond to the stud 102 is strong enough to allow its use, however, repeated loadings, age-related decay, or even manufacturing defects can cause the isolator to fail. When an isolator of the type depicted in FIG. 1 fails, the isolated assembly loses all connection to a structure on which it was connected by the isolator, potentially resulting in catastrophic damage. This is especially true in cases involving the potential for loading in various directions.

Furthermore, a failure of such a prior-art mechanical isolator requires the complete replacement of the isolator, increasing the expense and potential delay associated with such failures.

What is needed, therefore, is a mechanical isolator suitable for use in connecting relatively small assemblies to structures that fails gracefully, maintaining the connection between isolated assemblies and structures on which they are mounted, while being easily and quickly repairable using Cheap, Off-The-Shelf (COTS) components.

SUMMARY

One objective of the present disclosure is to provide an isolator that fails gracefully, remaining constrained and securing an apparatus connected thereto even after a failure of the elastomeric portion thereof, avoiding the potential for catastrophic failure.

Another objective of the present disclosure is to provide an isolator that can be quickly rebuilt to restore performance following elastomer degradation and that can also be quickly adapted to a new application or otherwise adjusted.

Still another objective of the present disclosure is to provide an isolator having a simple design that can be easily manufactured and rebuilt using Cheap, Off-The-Shelf (COTS) parts.

One embodiment of the present disclosure provides an isolator, the isolator comprising: an isolator comprising a lower isolator post and an upper isolator post; an isolator compression disk configured to be secured to the upper isolator post; and at least three gaskets configured to be retained, in use, between an upper face of the isolator and a lower face of the isolator compression disk, wherein the lower isolator post, in use, is configured to be affixed to a first apparatus, wherein the upper isolator post is configured to be inserted through an aperture of a second apparatus, wherein the isolator compression disk is configured to retain the second apparatus against the isolator, and wherein the at least three gaskets are configured to prevent direct contact between the isolator and the second apparatus.

Another embodiment of the present disclosure provides such an isolator, wherein the isolator is configured to retain a first gasket between an upper face of the isolator and a lower portion of the second apparatus, wherein the isolator is configured to retain a second gasket circumferentially about the upper isolator post, within the portion thereof that, during use, would be disposed within the aperture of the second apparatus, and wherein the isolator is configured to retain a third gasket between a lower face of the isolator compression disk and an upper portion of the second apparatus.

A further embodiment of the present disclosure provides such an isolator further comprising an isolator post shoulder, wherein at least a portion of a bottom face of the isolator compression disk is configured to be secured against an upper face of the isolator post shoulder during use.

Yet another embodiment of the present disclosure provides such an isolator, wherein an axial compression ratio of the first gasket and third gasket is determined by a distance between the upper face of the isolator and the upper face of the isolator post shoulder relative to a thickness of the second apparatus at a point where the isolator is affixed during use.

A yet further embodiment of the present disclosure provides such an isolator, wherein a radial compression ratio of the second gasket is determined by a size of a gap created between a diameter of the upper isolator post at a location where the second gasket is disposed and a diameter of the aperture of the second apparatus at the same location.

Still another embodiment of the present disclosure provides such an isolator, wherein the gaskets comprise O-rings.

A still further embodiment of the present disclosure provides such an isolator, wherein the upper isolator post further comprises at least one circumferential groove configured to retain one of the at least three gaskets.

Even another embodiment of the present disclosure provides such an isolator, wherein the isolator further comprises a circular protrusion located in an upper face thereof that is configured to retain one of the at least three gaskets.

An even further embodiment of the present disclosure provides such an isolator, wherein the second apparatus further comprises at least one circular protrusion disposed in an upper face thereof that is configured to retain one of the at least three gaskets.

A still even another embodiment of the present disclosure provides such an isolator, wherein the upper isolator post and lower isolator post are threaded.

A still even further embodiment of the present disclosure provides such an isolator, wherein the upper isolator post is threaded.

Still yet another embodiment of the present disclosure provides such an isolator, wherein the isolator compression disk is configured to be secured to the upper isolator post using a nut.

One embodiment of the present disclosure provides a method of isolating an apparatus from a structure, the method comprising: providing an isolator, the isolator comprising: a lower isolator post and an upper isolator post; an isolator compression disk configured to be secured to the upper isolator post; and at least three gaskets configured to be retained, in use, between an upper face of the isolator and a lower face of the isolator compression disk, wherein the lower isolator post, in use, is configured to be affixed to a structure, wherein the upper isolator post is configured to be inserted through an aperture disposed in the apparatus, wherein the isolator compression disk is configured to retain the apparatus against the isolator, and wherein the at least three gaskets are configured to prevent any direct contact between the isolator and the apparatus affixing the lower isolator post to the structure; inserting the upper isolator post through an aperture disposed in the apparatus; and securing the isolator compression disk to the upper isolator post.

Another embodiment of the present disclosure provides such a method of isolating an apparatus from a structure, wherein the isolator is configured to retain a first gasket between an upper face of the isolator and a lower portion of the apparatus, wherein the isolator is configured to retain a second gasket circumferentially about the upper isolator post, within the portion thereof that, during use, would be disposed within the aperture of the second apparatus, and wherein the isolator is configured to retain a third gasket between a lower face of the isolator compression disk and an upper portion of the second apparatus.

A further embodiment of the present disclosure provides such a method of isolating an apparatus from a structure, wherein the isolator further comprises an isolator post shoulder, wherein at least a portion of a bottom face of the isolator compression disk is configured to be secured against an upper face of the isolator post shoulder during use.

Yet another embodiment of the present disclosure provides such a method of isolating an apparatus from a structure, wherein an axial compression ratio of the first gasket and third gasket is determined by the distance between the upper face of the isolator and the upper face of the isolator post shoulder relative to the thickness of the apparatus at the point where the isolator is affixed during use.

A yet further embodiment of the present disclosure provides such a method of isolating an apparatus from a structure, wherein a radial compression ratio of the second gasket is determined by the size of a gap created between diameter of the upper isolator post at the location where the second gasket is disposed and the diameter of the aperture of the apparatus at the same location.

Still another embodiment of the present disclosure provides such a method of isolating an apparatus from a structure, wherein the gaskets comprise O-rings.

A still further embodiment of the present disclosure provides such a method of isolating an apparatus from a structure, wherein the upper isolator post further comprises at least one circumferential groove configured to retain a gasket.

One embodiment of the present disclosure provides an isolator, the isolator comprising: an isolator comprising a lower isolator post, an upper isolator post comprising at least one circumferential groove configured to retain a gasket, and an isolator post shoulder; an isolator compression disk configured to be secured to the upper isolator post; and at least three gaskets configured to be retained, in use, between an upper face of the isolator and a lower face of the isolator compression disk, wherein the lower isolator post, in use, is configured to be affixed to a first apparatus, wherein the upper isolator post is configured to be inserted through an aperture of a second apparatus, wherein the isolator compression disk is configured to retain the second apparatus against the isolator, wherein the at least three gaskets are configured to prevent any direct contact between the isolator and the second apparatus, wherein the isolator is configured to retain a first gasket between an upper face of the isolator and a lower portion of the second apparatus, wherein the isolator further comprises a circular protrusion located in the upper face thereof that is configured to locate the first gasket, wherein the isolator is configured to retain a second gasket circumferentially about the upper isolator post, within the portion thereof that, during use, would be disposed within the aperture of the second apparatus, wherein the isolator is configured to retain a third gasket between a lower face of the isolator compression disk and an upper portion of the second apparatus, wherein the second apparatus comprises at least one circular protrusion disposed in the upper portion thereof that is configured to locate the third gasket, wherein at least a portion of a bottom face of the isolator compression disk is configured to be secured against an upper face of the isolator post shoulder during use, wherein an axial compression ratio of the first gasket and third gasket is determined by the distance between the upper face of the isolator and the upper face of the isolator post shoulder relative to the thickness of the second apparatus at the point where the isolator is affixed during use, wherein a radial compression ratio of the second gasket is determined by the size of a gap created between diameter of the upper isolator post at the location where the second gasket is disposed and the diameter of the aperture of the second apparatus at the same location, wherein the gaskets comprise O-rings, wherein the upper isolator post and lower isolator post are threaded, and wherein the isolator compression disk is configured to be secured to the upper isolator post using a nut.

The features and advantages described herein are not all-inclusive and, in particular, many additional features and advantages will be apparent to one of ordinary skill in the art in view of the drawings, specification, and claims. Moreover, it should be noted that the language used in the specification has been selected principally for readability and instructional purposes and not to limit the scope of the inventive subject matter.

These and other features of the present embodiments will be understood better by reading the following detailed description, taken together with the figures herein described. The accompanying drawings are not intended to be drawn to scale. For purposes of clarity, not every component may be labeled in every drawing.

DETAILED DESCRIPTION

Figure 1:
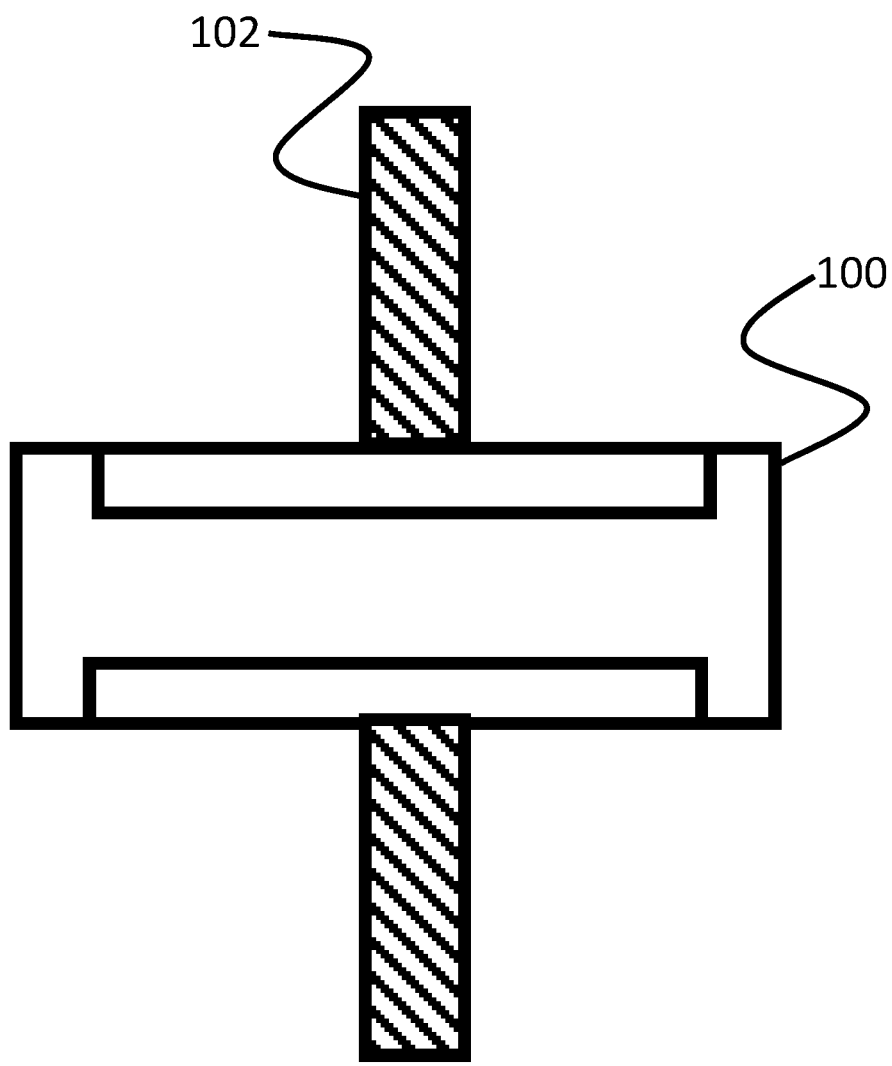
FIG. 1 is a side elevation view of a prior art isolator.
Figure 2:
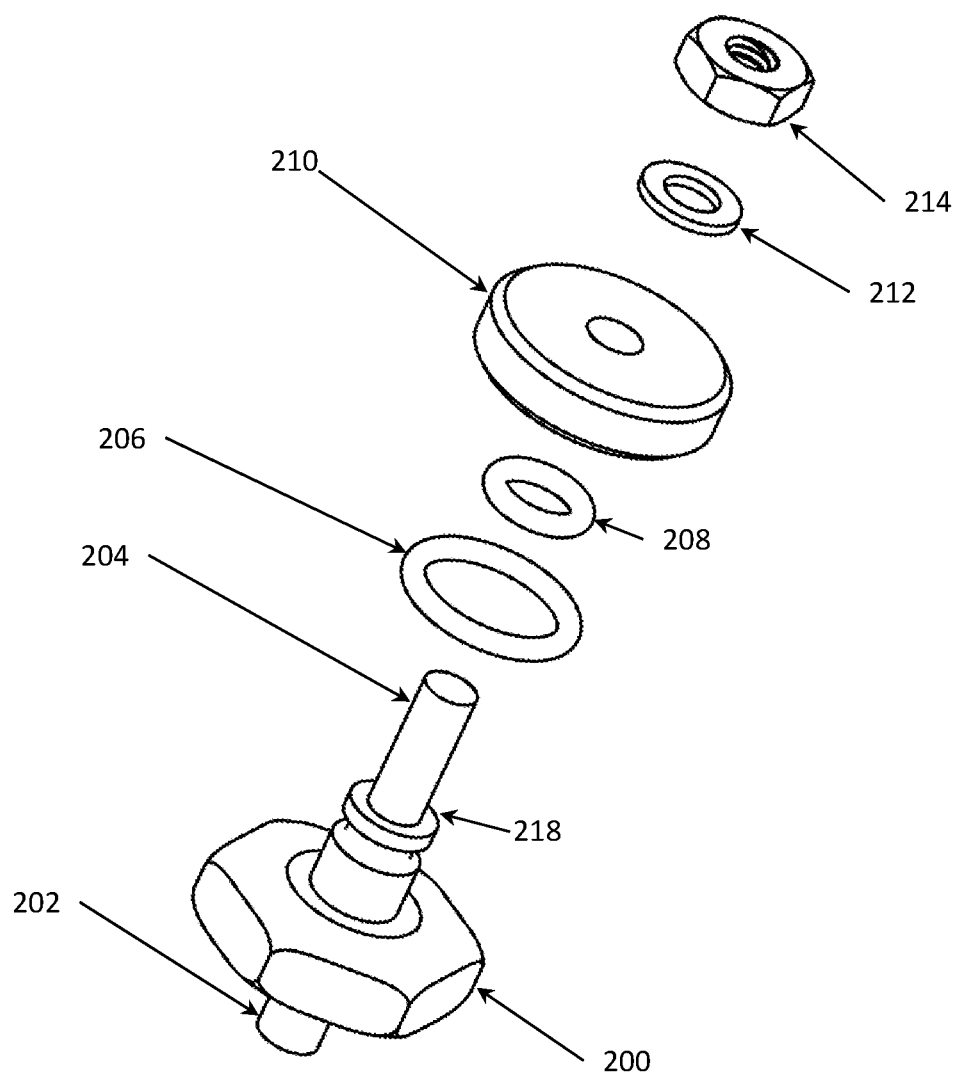
FIG. 2 is an isometric, exploded view of an isolator, in accordance with embodiments of the present disclosure.

Now referring to FIG. 2, an isometric, exploded view of an isolator, in accordance with embodiments of the present disclosure, is depicted. More specifically, the isolator comprises an isolator 200, the isolator 200 comprising a lower isolator post 202 and an upper isolator post 204, with the posts being adapted to allow securing one apparatus to another. While the apparatuses to be secured to one another could be of any type, one example of a first apparatus 222 is a fuselage of an airplane and one example of a second apparatus 220 to be secured to the first apparatus is a radar module. Another example of a first apparatus 222 is a circuit board and an example of a corresponding second apparatus 220 is a case for the circuit board. These examples of a first apparatus 222 and second apparatus 220 are exemplary only and not intended to be limiting, as embodiments of the present disclosure, as described herein, allow for the securing of virtually any apparatus to another.

Figure 3:
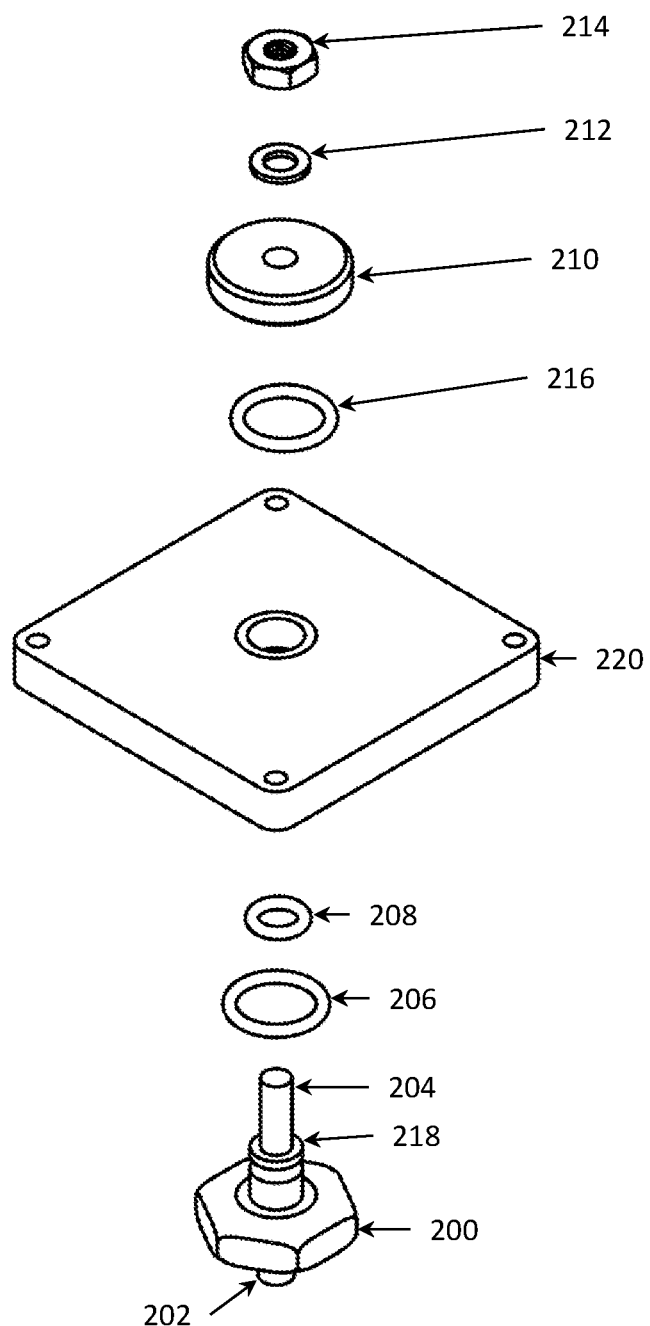
FIG. 3 is an isometric, exploded view showing an isolator connected to an apparatus, in accordance with embodiments of the present disclosure.

In embodiments, the upper isolator post 204 further comprises at least one substantially circular protrusion on a base portion thereof and at least one groove disposed about the upper isolator post 204, each configured to retain a gasket, in embodiments an O-ring, with the gasket disposed on the base portion being referred to herein as the lower isolator O-ring 206 and the gasket disposed in the groove disposed about the upper isolator post 204 being referred to herein as the upper isolator O-ring 208. The isolator further comprises an isolator compression disk 210 configured to be secured to the upper isolator post 204, in embodiments using an isolator compression disk washer 212 and an isolator compression disk nut 214, which is configured to seat on the isolator post shoulder 218 and sets the vertical compression ratio for a gasket, in embodiments an O-ring, which is referred to herein as the isolator compression disk O-ring 216, as depicted in FIG. 3. As one of ordinary skill in the art would be aware, however, many other suitable methods of attaching the isolator compression disk 210 to the isolator 200 would be possible.

In embodiments, the lower isolator post 202 and upper isolator post 204 are threaded; in such embodiments, the lower isolator post 202 may further comprise flats or a hex-shaped portion to allow it to be readily threaded into a structure. In this configuration, the lower isolator post 202 allows the isolator 200 to be threaded into a material of a first apparatus 222 on which the second apparatus 220 is to be mounted while the upper isolator post 204 is inserted through an aperture disposed in the second 220 apparatus and the isolator compression disk 210 is secured on an opposite side of the aperture, sandwiching the second apparatus 220 between the isolator compression disk 210 and isolator 200.

In embodiments, the at least one substantially circular protrusion on a base portion of the isolator 200 and at least one groove disposed about the upper isolator post 204 are configured to retain a standard size O-ring. In embodiments, the apparatus to be secured by the isolator also includes at least one groove disposed on an upper face thereof that is configured to retain a standard size O-ring, which, during use, is compressed against the apparatus by the isolator compression disk 210.

Now referring to FIG. 3, the isolator, specifically the upper isolator post 204 thereof, is shown attached to a second apparatus 220, in accordance with embodiments. In this figure, it can be seen that an additional O-ring, an isolator compression disk O-ring 216, is disposed beneath the isolator compression disk 210, which is configured to bottom out against the isolator post shoulder 218, leaving a predetermined, fixed distance between an upper face of the isolator 200 and a lower face of the isolator compression disk 210. This distance, less the thickness of the second apparatus 220 at the point to which the isolator is mounted, in conjunction with the thickness of the O-rings themselves, determines the compression ratio of the lower isolator O-ring 206 and isolator compression disk O-ring 216, allowing for a predetermined, optimal amount of compression to be applied that is maintained regardless of how tightly the isolator compression disk 210 is installed. Such a design isolates the second apparatus 220 from the isolator and structure to which the isolator is mounted, in embodiments the first apparatus 222, attenuating any vibrations therefrom, while maintaining the connection of the second apparatus 220, to the structure, in embodiments the first apparatus 222, even in the event of a total failure of the O-rings (206/216).

Figure 4:
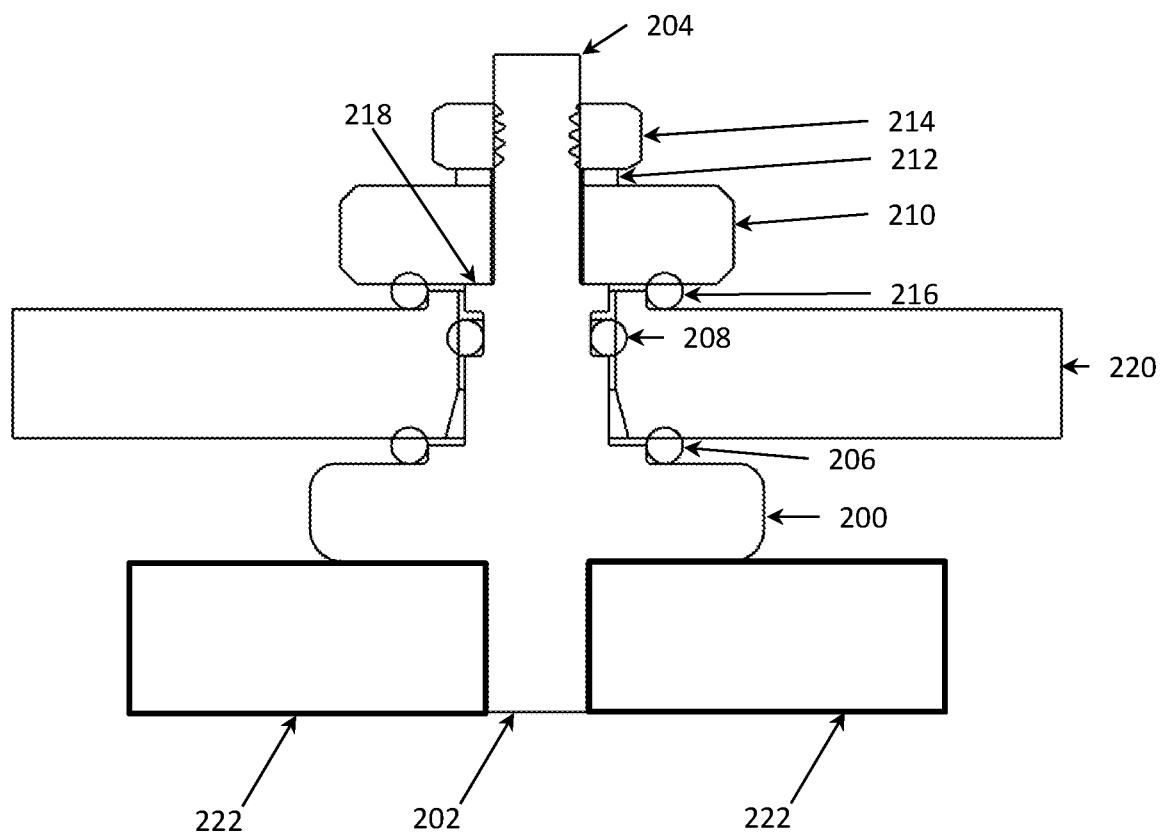
FIG. 4 is a side-elevation, cross-sectional view of an isolator, in accordance with embodiments of the present disclosure.

Now referring to FIG. 4, a side-elevation, cross-sectional view of an isolator, in accordance with embodiments of the present disclosure, is depicted. In this view, it can be seen that the O-rings, i.e. the lower isolator O-ring 206, upper isolator O-ring 208, and isolator compression disk O-ring 216, completely isolate the isolator from the apparatus being secured, sometimes herein referred to as the second apparatus 220, thereby isolating the structure onto which the second apparatus 220 is mounted, which is sometimes herein referred to as the first apparatus 222, therefrom as well, with all vibrations needing to pass through the O-rings before transmission to the structure to which the apparatus is secured. More specifically, the lower isolator O-ring 206 and isolator compression disk O-ring 216 restrain the second apparatus 220 being secured from movement, relative to the isolator, in a vertical direction while the upper isolator O-ring 208 supports the second apparatus 220 against lateral movement.

Figure 5A:
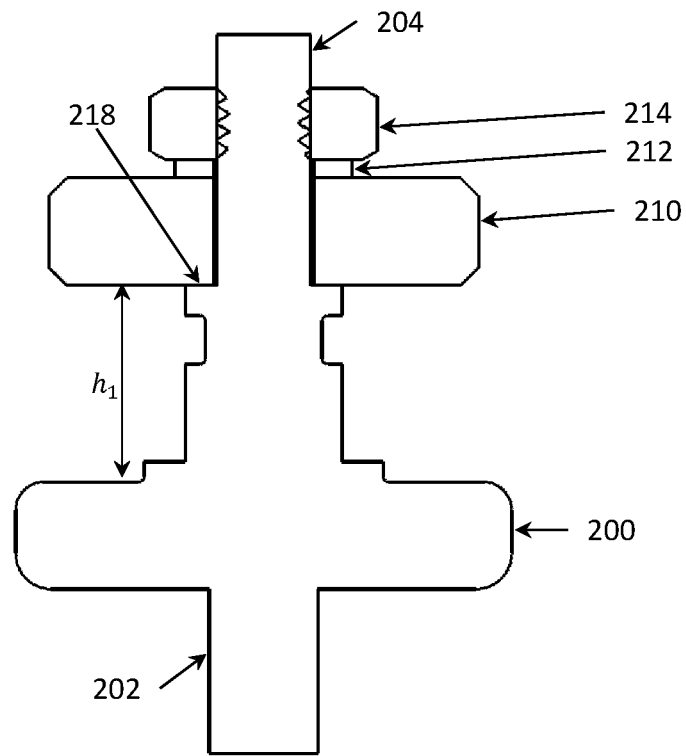
FIGS. 5A and 5B are cross-sectional views of an isolator and an isolator connected to an apparatus, respectively, showing how axial gasket compression is determined, in accordance with embodiments of the present disclosure.
Figure 5B:
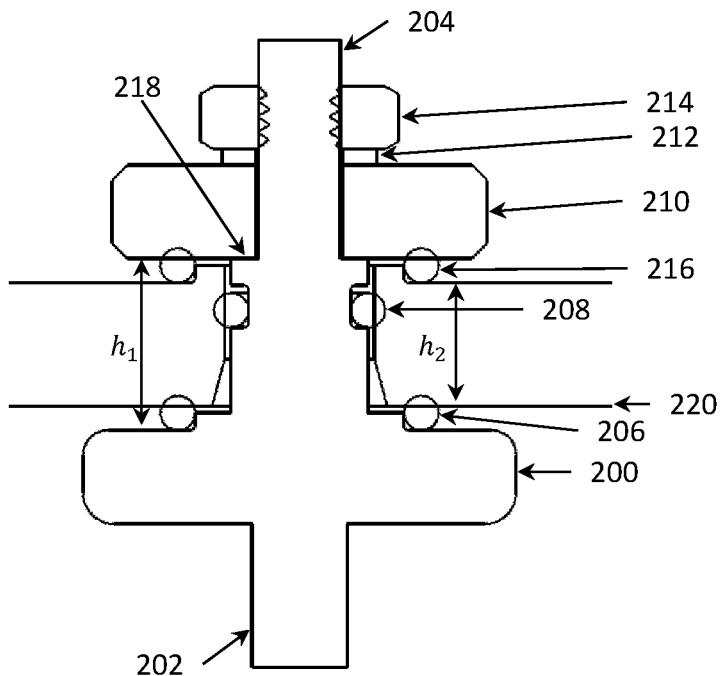

FIGS. 5A and 5B, which comprise cross-sectional views of an isolator and an isolator connected to the second apparatus 220, respectively, visually depict how axial O-ring compression is determined. More specifically, the axial compression ratio of the O-rings that restrain the second apparatus 220 being secured from movement, relative to the isolator, in a vertical direction (206 and 216), is set mechanically by the distance between an upper face of the isolator 200 and the isolator post shoulder 218 (i.e. $h_1$-$h_2$). Even more specifically, the gasket compression distance is defined by the following equation:

$$\text{Gasket Compression Distance} = \frac{h_1 - h_2}{2}.$$

The compression ratio is then determined by dividing the gasket compression distance by the original thickness of the gasket (e.g. an O-ring).

Figure 6:
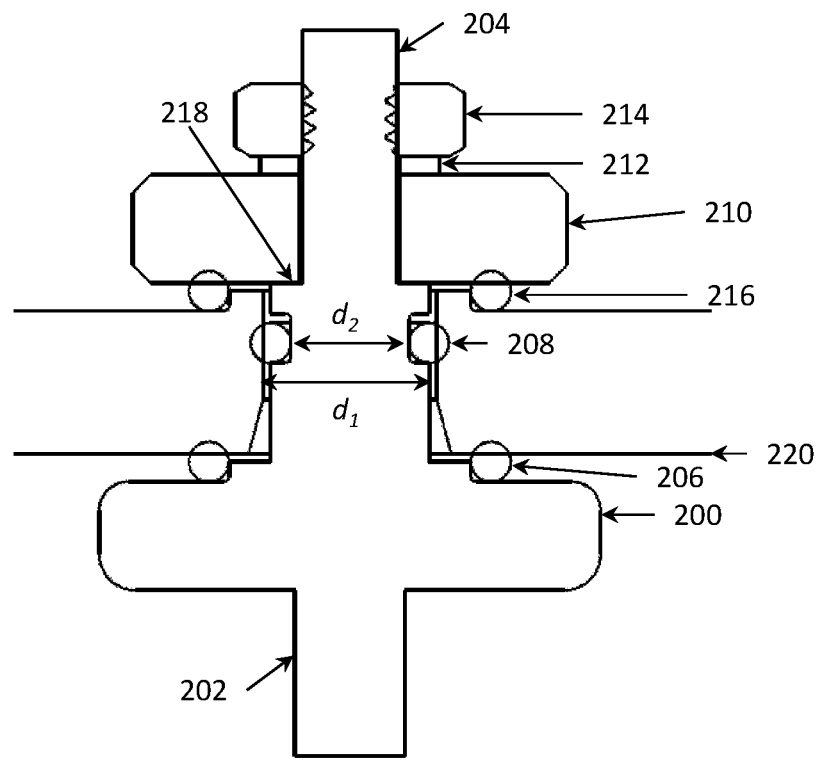
FIG. 6 is a cross-sectional view showing how radial gasket compression is determined, in accordance with embodiments of the present disclosure.

Now regarding FIG. 6, which depicts a cross-sectional view showing how radial O-ring compression is determined, in accordance with embodiments of the present disclosure, it is shown that the compression of the upper isolator O-ring 208 is set by the gap created between the at least one groove disposed about the upper isolator post 204 and the width of the apparatus being mounted to a structure. More specifically, the gasket compression distance can be determined using the following formula:

$$\text{Gasket Compression Distance} = \frac{d_1 - d_2}{2}.$$

Notably, the axial and radial gasket compression ratios obtained using such a design are independent of the torque applied to the isolator compression disk 210. Therefore, the compression ratio can be easily modified for a given gasket at the design stage. The same is true in the radial direction, where the compression ratio is set by the relationship between the diameter of the upper isolator post 204 and the diameter of the through hole in the apparatus to be secured by the isolator 200.

Furthermore, because O-rings are available in a variety of elastomeric materials and sizes with different hardness ratings, abilities to absorb vibration, and chemical resistance, the isolator disclosed herein can be readily configured for a variety of different applications. Furthermore, in the event of a complete failure of any or all of the O-rings used in such a design, the design fails gracefully, continuing to restrain the apparatus being secured.

Still another benefit of this design is that it can be easily rebuilt in the event of O-ring failure or for testing purposes, by simply removing the isolator compression disk 210 and replacing the worn, failed, or improper O-rings with new ones, which are readily available.

Even still another benefit of embodiments described herein is that they can be adapted for almost any design while remaining simple, elegant, and low displacement.

Even still yet another benefit of embodiments described herein is that the gasket compression, which determines the isolation properties, will not relax over time, since it is set by the distance between fixed elements.

Preliminary testing has shown this isolator type to perform well in high frequency (2,000 Hz-10,000 Hz) applications.

Embodiments could be used in almost any system that would benefit from vibration isolation.

The foregoing description of the embodiments of the present disclosure has been presented for the purposes of illustration and description. It is not intended to be exhaustive or to limit the present disclosure to the precise form disclosed. Many modifications and variations are possible in light of this disclosure. It is intended that the scope of the present disclosure be limited not by this detailed description, but rather by the claims appended hereto.

A number of implementations have been described. Nevertheless, it will be understood that various modifications may be made without departing from the scope of the disclosure. Although operations are depicted in the drawings in a particular order, this should not be understood as requiring that such operations be performed in the particular order shown or in sequential order, or that all illustrated operations be performed, to achieve desirable results.

What is claimed is:

1. An isolator, the isolator comprising:
an isolator comprising a lower isolator post and an upper isolator post;
an isolator compression disk configured to be secured to the upper isolator post; and
at least three gaskets configured to be retained, in use, between an upper face of the isolator and a lower face of the isolator compression disk,
wherein the lower isolator post, in use, is configured to be affixed to a first apparatus,
wherein the upper isolator post is configured to be inserted through an aperture of a second apparatus,
wherein the isolator compression disk is configured to retain the second apparatus against the isolator,
wherein the at least three gaskets are configured to prevent direct contact between the isolator and the second apparatus;
wherein the isolator is configured to retain a first gasket between an upper face of the isolator and a lower portion of the second apparatus, wherein the isolator is configured to retain a second gasket circumferentially about the upper isolator post, within the portion thereof that, during use, would be disposed within the aperture of the second apparatus, and wherein the isolator is configured to retain a third gasket between a lower face of the isolator compression disk and an upper portion of the second apparatus; and
wherein an axial compression ratio of the first gasket and third gasket is determined by a distance between the upper face of the isolator and the upper face of the isolator post shoulder relative to a thickness of the second apparatus at a point where the isolator is affixed during use.

2. The isolator of claim 1 further comprising an isolator post shoulder, wherein at least a portion of a bottom face of the isolator compression disk is configured to be secured against an upper face of the isolator post shoulder during use.

3. The isolator of claim 1 wherein a radial compression ratio of the second gasket is determined by a size of a gap created between a diameter of the upper isolator post at a location where the second gasket is disposed and a diameter of the aperture of the second apparatus at the same location.

4. The isolator of claim 1 wherein the gaskets comprise O-rings.

5. The isolator of claim 1 wherein the upper isolator post further comprises at least one circumferential groove configured to retain one of the at least three gaskets.

6. The isolator of claim 5 wherein the isolator further comprises a circular protrusion located in an upper face thereof that is configured to retain one of the at least three gaskets.

7. The isolator of claim 6 wherein the second apparatus further comprises at least one circular protrusion disposed in an upper face thereof that is configured to retain one of the at least three gaskets.

8. The isolator of claim 1 wherein the upper isolator post and lower isolator post are threaded.

9. The isolator of claim 1 wherein the upper isolator post is threaded.

10. The isolator of claim 9 wherein the isolator compression disk is configured to be secured to the upper isolator post using a nut.

\* \* \* \* \*